United States Patent [19]

Hoey

[11] E Re. 28,682

[45] Reissued Jan. 13, 1976

[54] DECORATIVE LAMINATE

[75] Inventor: Charles E. Hoey, Marlton, N.J.

[73] Assignee: Rohm & Haas Company, Philadelphia, Pa.

[22] Filed: June 9, 1975

[21] Appl. No.: 585,154

Related U.S. Patent Documents

Reissue of:

[64] Patent No.: 3,804,700
Issued: Apr. 16, 1974
Appl. No.: 255,879
Filed: May 10, 1972

[52] U.S. Cl. ..... 428/196; 428/159; 428/201; 428/202; 428/211; 428/315

[51] Int. Cl.[2] ..... B32B 3/26

[58] Field of Search ..... 428/159, 196, 201, 202, 428/211, 315, 321, 322; 156/77, 78, 79

[56] References Cited

UNITED STATES PATENTS

| | | | |
|---|---|---|---|
| 3,336,180 | 8/1967 | Werner | 428/315 |
| 3,446,685 | 5/1969 | Goldstone et al. | 428/167 |
| 3,496,043 | 2/1970 | Ragan | 428/315 |
| 3,528,866 | 9/1970 | Stevens | 428/322 |
| 3,591,401 | 7/1971 | Snyder et al. | 428/314 |
| 3,607,341 | 9/1971 | Goins et al. | 428/310 |
| 3,647,607 | 3/1972 | Hillers | 428/159 |
| 3,700,515 | 10/1972 | Terry | 428/97 |

OTHER PUBLICATIONS

Plastics/Paper, Warren Co. Div. Scott Paper, Nov. 1968, 6 pages.

Release Paper Information, Warren Co. Div. Scott Paper, Nov. 1970, 2 pages.

Plastics/Paper, Warren Co. Div. Scott Paper, 1971, 14 pages.

Rohm and Haas Reporter, Vol. XXVII, No. 2, Mar. -Apr. 1969, pages 12–15.

*Primary Examiner*—William J. Van Balen
*Attorney, Agent, or Firm*—Terence P. Strobaugh

[57] ABSTRACT

A procedure is provided for producing a laminate having a textile backing, a crushed, thermoset plastic foam bonded thereto, and a transparent polymeric film, preferably also a thermoset, which may be printed or colored overall overlying the foam. The structure is self-bonded, i.e., no adhesive is used to bond the laminate to one another. The preferred procedure is to apply a thin layer of foamed latex of a thermosettable polymer on a textile followed by drying the foam, the thickness of the foam being between about 10 mils and 150 mils. The transparent film, preferably thermosetting, is suitably formed by casting a latex upon a release surface such as silicone release paper and drying the same without causing thermosetting (if a thermosettable polymer is utilized). The dry film, still on the release paper, is then suitably coated or printed with a decorative design. The decorated side of the film is then placed against the dried foam layer and bonded thereto by pressure. The thermosetting may be done simultaneously with bonding or subsequently thereto.

4 Claims, No Drawings

DECORATIVE LAMINATE

Matter enclosed in heavy brackets [ ] appears in the original patent but forms no part of this reissue specification; matter printed in italics indicates the additions made by reissue.

This invention relates to a decorative laminate such as a simulated oil painting and a process for its manufacture. The laminate consists of a substrate such as a textile fabric, a crushed, thermoset foam self-adhered thereto and a top layer of of a clear film, which may be printed or otherwise colored by coating, pigmenting, or dyeing. The printed or coated side of the film can be adhered to the foam to encapsulate the color in order to protect it from abrasion, cleaning, etc. Preferably the film is also thermoset. The laminae are self-adhered or self-bonded; i.e., no extraneous adhesive is needed.

In the past, similar laminates have been made without a foam interlayer, and unless the clear film is exceptionally thick, the product is not subject to embossing in such a way as to keep the backing in substantially planar form. Where an interlayer has been used between the decorative material and the substrate, it has either been a resilient material of a relativelly massive thickness or in some cases a thermoplastic material. Where forms have been used for this function, the foam is either of such light weight and low density that a fabric-like hand could not be obtained, or is a dense foam provided by controlling the amount of blowing or foaming agent or controlling the extent of expansion, the product thus being relatively stiff and inflexible and again does not have the hand of a soft fabric. Commonly in laminating fabrics to foams or foams to other layers such as a transparent film, the practice is to use a separate adhesive layer for such bonding or to use thermoplastic materials which can be softened and bonded by heat and pressure. The present invention makes it unnecessary to use such adhesive, thus substantially reducing the number of operations necessary to achieve the product of the invention.

In a preferred embodiment of the present invention, the clear film is prepared from a latex as is the foam interlayer. Also, it is preferred that the clear film be thermosetting and that it be cured only after being in contact with the dry thermosettable foam and that the curing take place, of course, subsequent to or simultaneous with crushing or embossing the foam. Curing of the composite may also be delayed until fabrication, where the composite can be heat sealed to produce seams without sewing.

In a specific preferred embodiment, a clear crosslinkable or thermosettable acrylic film is desposited in the form of a latex onto release paper coated with a silicone release coating, the film is dried without thermosetting, and a decorative material is printed on the dried clear film while still on the release paper. A similar crosslinkable acrylic polymer in latex form is foamed, preferably by means of whipped in air and in the presence of a foam stabilizer, the foam is then applied to a fabric, woven or non-woven, and gelled and dried without causing crosslinking. The printed side of the clear film and the foamed surface of the fabric-foam laminate are then juxtaposed, the foam is reduced in thickness by pressure, with or without embossing a design in the laminate, and the clear film and foam layer are heated to a temperature sufficiently high to crosslink and thermoset the polymers. Other clear films may be used and other thermosettable foams may be used, but in every case the foam is thermoset only after being reduced in thickness. The foam, when a latex, is initially foamed to a wet foam density of about 0.5 to 0.05 grams per cubic centimeter and is applied in a thickness of from about 10 to 150 mils. The density, of course, will vary with the presence or absence of pigments and fillers and their identity. The foam is then dried without causing thermosetting, crosslinking, or vulcanization to a sensibly dry condition, for example, to an air-dry or sensibly dry state, for example, by heating at a temperature below that which causes said thermosetting, crosslinking, or vulcanization, an example being from 1 to 10 minutues at an oven temperature of 200°–350°F., followed preferably after having placed the decorated side of the clear film and the surface of the foam together, by crushing the foam to a thickness between 5 percent and 25 percent of its original dry thickness to give a density of about 0.2 to 3 g./cc.$^3$, followed by curing of the crushed foam. In general, the thickness of the dried foam prior to crushing may be substantially less than that of the wet foam, there at times being some shrinkage. This shrinkage is in the range of 0 to 30 percent of the thickness of the wet foam being lost during drying. Suitable moisture contents range from 5 percent to 15 or 20 percent in order to qualify as air dry or sensibly dry materials. The criteria as to moisture content is that the foam must be stable enough to be self-bonded to the top film. Of course, in a system wherein a chemical blowing agent is used to form the foam or in which a solvent system is utilized to form the foam, when the foam is dried it is essentially anhydrous. In some cases cross-linking may be accomplished by catalysis rather than primarily by the application of heat. Of course, the foam may be crushed before it is self-bonded to the surface film, but in this case a crushing roll having a release coating such as a silicone or Teflon is desirable. Normally no adhesive is needed between the foam and the textile or between the decorated surface of the clear film and the surface of the foam, since a thermosettable foam is used, and the final curing of the foam causes a firm bond between the layers.

Crushed foam is essential, since if the initial foam is formed to the final density by control of the amount of foaming agent or by means such as using a chemical blowing agent and restraining the expansion in order to get the final density, the walls or struts connecting the air spaces are relatively thick. A crushed foam, on the other hand, initially having expanded to a number of times its final thickness, has connective walls or struts of a thin flexible nature. The result is that the crushed foam is much more flexible than a foam initially expanded to the density noted above. These foams are inherently opaque. The opacity can be compared with the opacity of whipped egg whites; the liquid egg white is substantially transparent and the gas cells incorporated therein confer opacity upon the whipped froth.

When pigmented compositions are contemplated, examples of the pigments that may be employed include clays especially of the kaolin type, calcium carbonate, blanc fixe, talc, titanium dioxide, colored lakes and toners, ochre, carbon black, graphite, aluminum powder or flakes, chrome yellow, molybdate orange, toluidine red, copper phthalocyanines, such as the "Monastral" blue and green lakes. If dyed compositions are used, examples of dyes for acrylic film and foam include basic and dispersed dyes. Other composites could be made dyeable, if not inherently so, through the use of additives such as methyl cellulose, hydroxyl ethyl cellulose, and the like. Other dyes which could be used include acid dyes, vat dyes, direct dyes, and fiber reactive dyes.

The clear film is preferably cast from a single acrylic latex (thickened if necessary) or other suitable latex such as carboxylated SBR containing antioxidants or UV stabilizers, polyvinyl chloride, ethylene polyvinyl chloride, polyvinylidene chloride, polyvinyl acetate, polyvinyl alcohol as well as copolymers of these latices. The film has delayed cure properties built into it where strigent durability requirements (resistance to multiple washing and drycleaning) exist.

The film may be cast from two or more latices to achieve specific effects. For example, the "first-down" basecoat latex can be selected for its toughness and its freedom from residual tackiness. The "second-down" topcoat can be a softer material providing more plastic flow under heat and pressure to achieve embossing, lamination and heat sealing where necessary.

The finish on release paper (or other suitable release medium) can be picked up by the transfer film when it is pulled off of the release medium to provide a surface finish for other specific effects. For example, silicone surfaced release paper can be engineered so that some of the silicone goes with the film when it is pulled off the release paper to provide the water repellency.

Solvent systems can be used instead of latices alone, or in combination with aqueous systems where multilayer films are made as previously described. For example, a solvent saran first-down coat can be topped with an aqueous coating so that the composite film, when pulled off release paper and inverted, would expose a tack-free saran outer surface.

The films can be made breathable by mechanically foaming the latex before casting, mechanically puncturing the film, using chemical blowing agents or dissolving or digesting out temporary fillers placed in the latex before it is cast. An example of the latter method would be the use of starch granules in the mix before casting, subsequently digesting the starch granules with an enzyme leaving pores in the film.

For specialty effects, the film can be colored by pigmenting the liquid medium before casting, adding dyes to the liquid medium before casting, post-dyeing the composite or vacuum metalizing the film after casting. Another includes printing or coating the release medium with pigments or ink which would be transferred to the film after it is dried and pulled away from the release medium.

A delayed cure acrylic film is preferred which provides freedom from plasticizer as a means of minimizing pollution as well as avoiding the possibility that plasticizer migration will cause the foam and film to separate eventually. In addition, there is a distinct likelihood that the presence of plasticizers in either the film or the foam will cause printing inks to bleed distorting decorative effects.

While the preferred clear (essentially transparent) film is that obtained from a crosslinkable acrylic latex as suggested herein, other crosslinkable latices are useful as are preformed films. Examples of other latices are crude rubber in which 3 percent of the polymer is in the form of combined maleic anhydride, butadiene-styrene polymers and butadiene-acrylonitrile polymers containing 3 percent to 5 percent carboxylated groups, carboxylated polyisoprene, and other natural and artificial polymers modified to have cross-linkable or thermosettable functionality. In each case, external cross-linkers such epoxy exposy resins are used. As is implied by the above, the same general types of crosslinkable polymers are useful for both the clear film and the foam.

Thermoplastic films which may be used include polyvinyl chloride, ethylene-vinyl chloride copolymer, polyvinylidene chloride, polyvinyl acetate, polyvinyl alcohol and copolymers thereof, saran, polyurethane, Mylar, Tedlar (polyvinyl fluoride), ethylene-vinyl acetate, and the like. Similar preformed films can be made from ethylene-Vinyl acetate, ethylene-methyl acrylate, ethylene-ethyl acrylate copolymers, ionomers, vinyl chloride-propylene, vinyl chloride-ethylene, vinly chloride-acrylate, polyethylene, nylons, and chlorotrifluoroethylene, polyester, polycarbonate, and the like. While many of the clear theromplastic films are useful, they are not nearly so desirable as the thermosetting clear films deposited from latices, or less desirably from an organic solvent solution.

An embossed textured surface will not always be necessary and the composite can be made by simply adhering the film/foam/textile having a flat surface. Where a three dimensional effect is desired, this can be achieved by using embossed rolls or plates, nipping the composite through rolls or plates at the same time as embossed paper is passed through the nip or casting the film on release paper which has previously been embossed to such a depth that a flat surface of film is achieved for printing if necessary. Subsequently, the film on embossed release paper and the foam on the supporting substrate are run through a plain nip and the embossed pattern is imparted through the composite by the embossed release paper on which the film was originally cast. After the marriage, the embossed release paper can be pulled away from the composite and reused. After crushing the foam and embossing, if used, the laminate is cured (thermoset, cross-linked) by heating at a suitable temperature, for example, 1 to 5 minutes at 275°–375° F.

An important advantage in utilizing a dried but uncured foam of a crosslinkable polymer and a dried but uncured clear film, printed or not, is that the two elements can be passed through the nip of a pair of rollers, the distance between which is small enough to "marry" the two but insufficient to crush the dried foam, all without using an adhesive to bond the foam to the fabric or other substrate and to bond the foam to the clear printed or unprinted film. Of course, bonding of the dry foam and the clear film can be done at a pressure sufficient to crush the foam with or without embossing the same. Even after crushing, the foam has sufficient resilience to be embossed with a patterned roller. If desired, the embossing roller may be heated to the curing temperature of the thermosetting film and foam, although normally a period of time is required which necessitates passing the laminate through an oven.

For a description of suitable conventional foaming procedures and foam stabilizers and foaming agents, reference is made to Madge, E. W., "Latex Foam Rubber," John Wiley and Sons, New York (1962) and Rogers, T. H., "Plastic Foams," Paper, Reg. Tech. Conf., Palisades Sect., Soc. Plastics Engrs., New York, November, 1964. Most common are the alkali metal, ammonia, and amine soaps of saturated or unsaturated acids having, for example, from about 12 to about 22 carbon atoms. Examples of suitable soaps include tallow soaps and coconut oil soaps, preferably the volatile amine or ammonia soaps, so that the volatile portion is vaporized from the foam. Other useful foaming-foam-stabilizing agents include lauryl sulfate-lauryl alcohol, lauryl sulfate-lauric acid, sodium lauryl sulfate, and other commonly used foamed stabilizers or foaming agents.

It is to be understood that the foam may be laminated to other substrates. Examples of such substrates include woven and non-woven fabrics, plastic films, rigid plastics, leather substitutes, leather, paper, wood including plywood, metals such as of steel, iron, aluminum, copper, brass, zinc which may be bare or primed such as with an epoxy or with an epoxy/aminoplast priming layer, and so forth.

Suitable woven and non-woven textile substrates include fiberglass, nylon taffetas and tricots, texturized polyester fabrics, cotton duck, Spandex knits, woolens and worsteds, flocked fabrics, rayon fabrics and blends of natural and synthetic fibers. The textile may be simply a functional supporting substrate or a textile having a pre-finished "face" to serve as the outer surface of the composite or as a lining. An example is a synthetic pile fur fabric, the back of which is used to function as the supporting substrate for the foam/film to end up with a composite having two functional and aesthetically appealing surfaces. Such a composite could be used to make a reversible coat which would have a leather-like texture on one side and a fur texture on the other. Non-wovens are made by air lay, dry lay, wet lay and spun-bonded processes. Various forms of paper and paperboard may also be used. Tissue is included as paper in this description.

The latex, when formulated with the foam stabilizer and optionally, suitable pigments, is readily convertible into the foamed state. The polymer composition is such that excessive thickening of the formulation is not encountered under the acid or alkaline conditions employed to assure the most efficient operation of the foam stabilizing agent. In addition the copolymer is such that the crushed foam retains its softness and its flexibility at low temperatures at least to a temperature as low as 10° F., and after curing is non-tacky. In addition, the foam is resistant to washing in normal detergents used for cleaning of textiles in general and drapery fabrics in particular and is resistant to drycleaning. By providing a foam that is durable to drycleaning and to washing the foam is quite useful for textiles which are frequently subjected to drycleaning and washing operations.

An important property of the polymer for both the foam and the clear film is the glass transition temperature (Tg) thereof, and consequently the selection of monomers and proportions thereof depends upon their influence on the Tg. The Tg of the polymer for the foam is suitably between −60° and 35° C. For the clear film, it is normally between −30° and 100° C. "Tg" is a conventional criterion of polymer hardness and is described by Flory, "Principles of Polymer Chemistry," pp. 56 and 57, (1953), Cornell University Press. While actual measurement of the Tg is preferred, it may be calculated as described by Fox, Bull. Am. Physics Soc. 1, 3, p. 123 (1956). Examples of the Tg of homopolymers and the inherent Tg thereof which permits such calculations are as follows:

| Homopolymer of | Tg |
|---|---|
| n-octyl acrylate | −80°C. |
| n-decyl methacrylate | −60°C. |
| 2-ethylhexyl acrylate | −70°C. |
| octyl methacrylate | −20°C. |
| n-tetradecyl methacrylate | 9°C. |
| methyl acrylate | 9°C. |
| n-tetradecyl acrylate | 20°C. |
| methyl methacrylate | 105°C. |
| acrylic acid | 106°C. |

These or other monomers are blended to give the desired Tg of the copolymer. As is known, for a given number of carbon atoms in the alcohol moiety, the extent and type of branching markedly influences the Tg, the straight chain products giving the lower Tg. Most of the esters of acrylic acid or methacrylic acid having a low Tg are well known in the art.

One of the monomers utilized in a substantial proportion to prepare the preferred clear films and foam is a "soft" monomer which may be represented by the following formula:

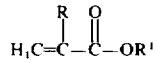

wherein R is H or alkyl having one to four carbon atoms and R′ is the straight chain or branched chain radical of a primary or secondary alkanol, alkoxyalkanol or alkylthiaalkanol, and having up to about 14 carbon atoms, examples being ethyl, propyl, n-butyl, 2-ethylhexyl, heptyl, hexyl, octyl, propyl, 2-methylbutyl, 1-methylbutyl, butoxybutyl, 2-methylpentyl, methoxymethyl, ethoxyethyl, cyclohexyl, n-hexyl, isobutyl, ethylthiaethyl, methylthiaethyl, ethylthiapropyl, n-octyl, 6-methylnonyl, decyl, dodecyl, and the like, said radicals $R^1$, when alkyl, having from two to about 14 carbon atoms, preferably from three to 12 carbon atoms, when R is H or methyl. When R is alkyl and $R^1$ is alkyl, $R^1$ should have from about six to about 14 carbon atoms and when R is H and $R^1$ is alkyl, $R^1$ should have from about two to about 12 carbon atoms, in order to qualify as a soft monomer.

Other ethylenically unsaturated copolymerizable monomers having a Tg of above 0° C. are useful in combinations with the above mentioned soft monomers provided they do not adversely affect the desired properties of the polymer (e.g., unduly raise the overall Tg) and do not seriously interfere with the crosslinking. These may be represented by the formula:

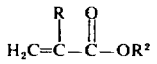

wherein R is as above. $R^2$ is preferably alkyl and is methyl or alkyl having from about 13 to about 20 carbon atoms when R is H, and is alkyl of from one to about five carbon atoms or alkyl of from about 15 to about 20 carbon atoms when R is methyl. It can be seen from about that for alkyl acrylates and alkyl methacrylates the Tg at first decreases with an increased chain length of the alkyl group and then the Tg again increases; i.e., both hard and soft monomers are known to occur in each group of monomers. Examples of these hard monomers and other hard monomers include: methyl acrylate, acrylamide, vinyl acetate, tetradecyl acrylate, pentadecyl acrylate, methyl methacrylate, ethyl methacrylate, t-butyl acrylate, butyl methacrylate, styrene, pentadecyl methacrylate, vinyl toluene, methacrylamide, and N-methylolacrylamide.

The preferred emuslion copolymers, for both the foam and the clear layer, having a molecular weight of between about 70,000 and 2,000,000, and preferably between about 250,000 and 1,000,000 and are made by the emulsion copolymerization of the several monomers in the proper proportions. Conventional emulsion polymerization techniques are described in U.S. Pat. Nos. 2,754,280 and 2,795,564. Thus, the monomers may be emulsified with an anionic, a cationic, or a nonionic dispersing agent, about 0.05 percent to 10 percent thereof ordinarily being used on the weight of the total monomers. The acid monomer and many of the other functional or polar monomers may be soluble in water so that the dispersing agent serves to emulsify the other monomer or monomers. A polymerization initiator of the free-radical type, such as ammonium or potassium persulfate, may be used alone or in conjunction with an accelerator, such as potassium metabisulfite, or sodium thiosulfate. Organic peroxides, such as benzoyl peroxide and t-butyl hydroperoxide are also useful initiators. The initiator and accelerator, commonly referred to as catalyst, may be used in proportions of 0.1 percent to 10 percent each based on the weight of monomers to be compolymerized. The amount, as indicated above, may be adjusted to control the intrinsic viscosity of the polymer. The temperature may be from room temperature to 60° C. or more as is conventional.

Suitable dispersing agents useful in emulsion polymerization include anionic types such as the sodium salts of the higher fatty acid sulfates, such as that of lauryl alcohol, the higher fatty acid salts, such as the oleates or stearates or morpholine, 2-pyrrolidone, triethanolamine or mixed ethanolamines, or any of the nonionic types, such as ethylene oxidemodified alkyl phenols, of which tert-octyl phenol modified by 20 to 40 ethylene oxide units is representative, ethylene oxide-modified higher fatty alcohols such as lauryl alcohol, containing 20 to 50 ethylene oxide units, similarly modified long-chain mercaptans, fatty acids, amines, or the like. Mixtures of nonionic and anionic dispersing agents are also useful.

Although emulsion polymers are preferred, polymers prepared in organic solutions, e.g., in xylene, methyl "Cellosolve" and the like, by well-known conventional means such as free-radical initiation with benzoyl peroxide or the like are also useful. Solution polymers useful in the invention preferably have a molecular weight of between about 10,000 and 1,000,000.

There are essentially two types of latent cross-linking which can be used. These are (1) crosslinking subsequent to polymerization by including monomers in the polymer recipe which have functional groups capable or crosslinking by various mechanisms including self-crosslinking, or mutual crosslinking by different functional groups, both in the polymer chain, and (2) latent crosslinking by means of an external separately added chemical compound. Combinations can be used.

The foam is subjected to latent crosslinking, after drying and crushing. Where addition polymers are involved, monomers which are suitable for this function include certain acrylics having crosslinkable functionality exemplified below.

Examples of the crosslinking reactions which are possible using heat, aging, and/or catalysis are:

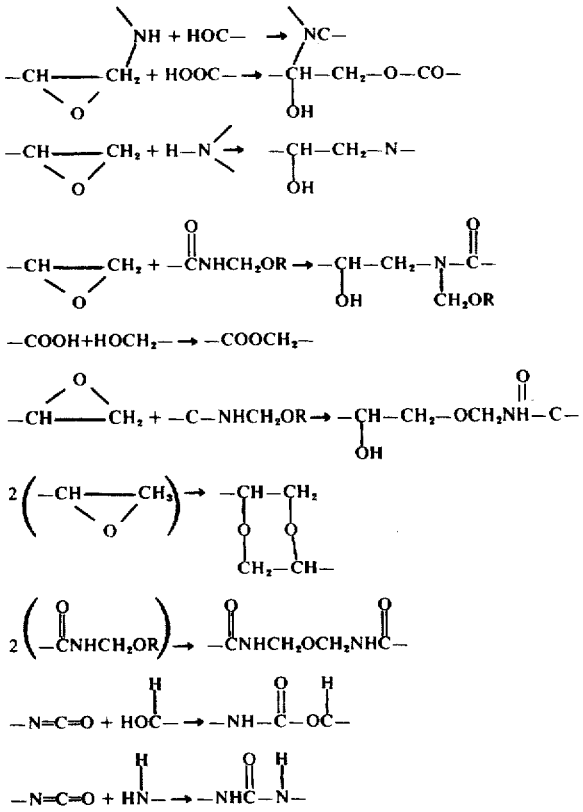

In the above, R is H or $CH_3$. Addition polymerizable unsaturated monomers containing such groups are well known in the art, examples being isocyanates such as isocyanatoethyl methacrylate, epoxy compounds such as glycidyl methacrylate, aminoalkyl compounds such as methylaminoethyl methacrylate, and t-butylaminoethyl methacrylate, amides such as methacrylamide, guanamines such ad 4-pentenoquanamine, hydroxyalkyl esters such as hydroxypropyl methacrylate and hydroxyethyl methacrylate, nitriles such as methacrylonitrile, N-alkoxyalkyl amides such as methoxymethyl methacrylamide, hydroxyalkyl amides such as N-methylol methacrylamide, the analogs of the above methacrylic acid derivatives with other unsaturated acids such as acrylic acid and itaconic acid, such acids themselves, dicarboxylic acids such as maleic acid and half esters and half amides thereof, vinyl ethers of glycols such as ethylene glycol, and so forth.

As may be seen, the crosslinkable addition polymerizable unsaturated monomers have reactive polar groups selected from those including —OH, —SH,

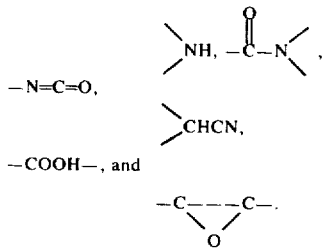

Such groups may be included as are mutually or self-crosslinkable, or separate crosslinking compounds such as a triazine-formaldehyde resin may be added, as is well known.

Of course, water sensitive materials such as isocyanates should not be used in aqueous systems unless they are blocked by groups such as phenol groups which protect the isocyanate groups until subsequent heating or the use of other reaction mechanisms such as the use of a calcium, zinc, or tin compound catalyst conventional in the art.

There is thus included within the copolymer up to 20 percent by weight of such functional, polar, or reactive monomer, preferably an unsaturated carboxylic acid, half esters and half amides of $\alpha$-unsaturated dicarboxylic acids, and salts thereof with ammonia, an alkali-metal, such as sodium, potassium or lithium, or with a volatile water-soluble amine such as dimethylamine or triethylamine, in order to provide the cross-linking functionality. Examples of copolymerizable ethylenically unsaturated monocarboxylic or polycarboxylic acids are sorbic, cinnamic, vinyl furoic, $\alpha$-chlorosorbic, p-vinylbenzoic, acrylic, methacrylic, maleic, fumaric, aconitic, atropic, crotonic, and itaconic acid, or mixtures thereof, with itaconic acid and the $\alpha$, $\beta$-unsaturated monocarboxylic acids, particularly methacrylic acid and acrylic acid, being preferred. Other copolymerizable acid monomers include the alkyl half esters or partial esters of unsaturated polycarboxylic acids such as of itaconic acid, maleic acid, and fumaric acid, or the partial amides thereof. Preferred half esters are the lower alkyl ($C_1$ to $C_6$) esters such as methyl acid itaconate, butyl acid itaconate, methyl acid fumarate, butyl acid fumarate, methyl acid maleate, and butyl acid maleate. Such partial esters and partial amides are considered to be "$\alpha,\beta$-unsaturated monocarboxylic acids," and the term as used herein includes such esters and amides.

In addition to or in place of the acids, amides such as acrylamide and methacrylamide, 2-sulfoethyl methacrylate, the materials disclosed in U.S. Pat. No. 3,446,777 to W. D. Emmons, U.S. Pat. No. 3,150,118 to D. H. Clemens, and U.S. Pat. No. 3,266,930 to W. D. Emmons and E. Hankins Owens, and various other functional, polar, or monomers having groups which remain reactive after the polymer is formed, for example, falling within the definitions of formulas II, III, IV, and V, are also useful, as follows:

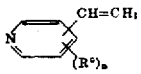

(II)

where $R^0$ is selected from the group consisting of H and alkyl groups having one to four carbon atoms, and n is an integer having a value of 1 to 4, $$CH_2 = C(R)AYNR^1R^2 \quad \text{(III)}$$

where R is selected from the group consisting of H and $CH_3$,

A is selected from the group consisting of O, S,

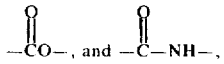

Y is an alkylene group having two to four carbon atoms, $R^1$ is selected from the group consisting of H and an alkyl group having one to four carbon atoms, and $R^2$ is selected from the group consisting of H and an alkyl group having one to four carbon atoms,

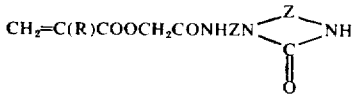

(IV)

where R is the same as above, and

Z is an alkylene group having two to three carbon atoms.

Examples of compounds of formula II include: 2-vinylpyridine; 4-vinylpyridine; 2-methyl-5-vinylpyridine; 5-methyl-2-vinylpyridine; 4-methyl-2-vinylpyridine; 2-ethyl-5-vinylpyridine; 2,3,4-trimethyl-5-vinylpyridine; 3,4,5,6-tetramethyl-2-vinylpyridine; 3-ethyl-5-vinylpyridine; 2,6-diethyl-4-vinylpyridine.

Examples of compounds of formula III include: dimethylaminoethyl acrylate and methacrylate; diethylaminoethyl acrylate and methacrylate dimethylaminopropyl acrylate and methacrylate; diethylaminopropyl acrylate and methacrylate; dipropylaminoethyl acrylate and methacrylate; di-n-butylaminoethyl acrylate and methacrylate; di-sec-butylaminoethyl acrylate and methacrylate; di-t-butylaminoethyl acrylate and methacrylate; dimethylaminoethyl vinyl ether and sulfide; diethylaminoethyl vinyl ether and sulfide; aminoethyl vinyl ether and sulfide; monomethylaminoethyl vinyl ether and sulfide; N,N-dimethylaminoethyl acrylamide and methacrylamide; N,N-diethylaminoethyl acrylamide and methacrylamide.

Examples of compounds of formula IV include: N-[$\beta$-($\alpha$-methacryloxyacetamido)ethyl]-N,N'-ethyleneurea; N-[$\beta$-($\alpha$-acryloxyacetamido)ethyl]-N,N'-ethyleneurea; N-[$\beta$-($\alpha$-acryloxyacetamido)ethyl]-N,N'-trimethyleneurea; N-[$\beta$-($\alpha$-methacryloxyacetamido)ethyl]-N,N'-trimethyleneurea.

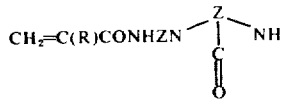

(V)

where R and Z are as defined above, of which an example is N-[β-(methacrylamido)ethyl]-N,N'-ethyleneurea.

Generally, such functional monomers are present in amounts of from 0.05 to 20 percent, preferably from 0.3 to 10 percent by weight, and more preferably 0.5 to 4.5 percent, based on the total monomers that form the coating or foamable resin.

The separate added crosslinker, when used, is useful with or without the use of mutual crosslinking groups and self-crosslinking groups. Among the external crosslinking methods or compounds is the use of organic peroxides such as benzoyl peroxide; the use of epoxy resins such as that obtained from bis-phenol A and epichlorohydrin; esterification, by means of dicarboxylic acids reacting with hydroxyl groups in the polymers, or by reacting diols or polyols such as neopentyl glycol, trimethylol propane, trimethylol ethane, or ethylene glycol with carboxyl groups in the polymer; use of aminoplasts such as melamine formaldehyde, urea formaldehyde, or butylated melamine formaldehyde; diamines and polyamines such as hexamethylene diamine, ethylene diamine, and the Versamids; polyisocyanates such as toluylene diisocyanate; compounds with mixed functionality such as ethanolamine, and other well-known external crosslinkers. The invention is not in the use of crosslinking per se but in the utilization of crosslinking and/or the bodying agent to obtain the desired physical characteristics of the foam or clear resin of the invention.

EXAMPLE 1

An emulsion compolymer dispersion prepared from 2,575 parts deionized water, 87 parts sodium lauryl sulfate, 90 parts acrylic acid, 315 parts acrylamide, 900 parts acrylonitrile, and 7,695 parts n-butyl acrylate is compounded in the following formulation:

| | Product | Solids |
|---|---|---|
| Dispersion | 200 | 100 |
| Titanium Dioxide (Titanox RA-45) | 25 | 25 |
| Clay (Acme WW) | 30 | 30 |
| Melamine-Formaldehyde Resin (Aerotex MW) | 4.6 | 3.7 |
| Ammonium Stearate | 14 | 4.6 |
| Water | 70 | — |
| Ammonia (28%) | 4 | — |
| | 347.6 | 163.3 |
| Solids - 47.0% | | |

All parts and percentages are by weight unless otherwise stated.

Foams are made by whipping air into the formulation using a Kitchen-Aid Mixer (Model C) to a wet density of about 0.16 g. cm.$^3$. The foam is then cast at 60 mils onto contton twill cloth, 19 mils thick and dried for 1.75 minutes at 280° F. to give a dry foam 45 mils thick.

On a silicone coated release paper 5 mils thick, a latex (50 percent solids) of 65 parts ethyl acrylate, 25 parts butyl acrylate, 5 parts acrylonitrile, 3.5 parts acrylamide and 1.5 parts itaconic acid is cast in a thickness to give a dry film 2 mils thick and dried at 95° C. for 3 minutes. The exposed side of the clear film is printed with a decorative design, and the printed side and dried foam are then placed together and passed through a pair of rollers, at room temperature, with a nip of 20 mils. The release paper is then peeled off. The laminate is then passed between a smooth and an embossed roller, both heated to 250°–300° F., the embossed roll being adjacent the clear film. This embosses the film and foam, crushes the 45 mil thick dry foam to about 8 mils thick, and firmly bonds the film, foam, and fabric. To achieve more complete crosslinking of the foam and film, the composite is heated in an oven for 2 minutes at 300° F.

The crushed foam has a cold-flex temperature of −15° F.

EXAMPLE 2

Example 1 is repeated except that 135 parts of itaconic acid, 315 parts of acrylamide, 5,850 parts of ethyl acrylate, 405 parts of acrylonitrile and 2,305 parts of n-butyl acrylate are used as the monomers for the foam.

EXAMPLE 3

Example 1 is repeated except that for the foam 675 parts of acrylonitrile and 2,035 parts of n-butyl acrylate are used and polymer drapery fabric is used. The resultant crushed foam has a cold-flex temperature of 15° F.

EXAMPLE 4

Example 1 is repeated except that 180 parts of acrylic acid, 315 parts of acrylamide, 900 parts of acrylonitrile and 7,605 parts of n-butyl acrylate are used as the monomers, for the foam.

EXAMPLE 5

Example 1 is repeated except that 45 parts of acrylic acid, 315 parts of acrylamide, 1,800 parts of acrylonitrile and 6,840 parts of n-butyl acrylate are used as the monomers, for the foam.

EXAMPLE 6

Example 1 is repeated but the monomers for the foam consist of 270 parts methacrylic acid, 180 parts acrylamide, 375 parts acrylonitrile, 2,250 parts butyl acrylate, and 5,925 parts ethyl acrylate.

EXAMPLE 7

The procedure described in Example 6 is repeated except the methacrylic acid is replaced with 45 parts of itaconic acid and the amount of butyl acrylate is changed to 2,475 parts.

EXAMPLE 8

The procedure described in Example 1 is followed with an emulsion polymer of 170 parts itaconic acid, 200 parts methacrylic acid, 135 parts acrylamide, 450 parts acrylonitrile, 2,700 parts butyl acrylate, and 3,485 parts ethyl acrylate, to prepare the foam.

EXAMPLE 9

The procedure described in Example 1 is carried out with an emulsion polymer of 135 parts methacrylic acid, 180 parts acrylamide, 630 parts acrylonitrile, 5,400 parts butyl acrylate, and 3,655 parts isopropyl acrylate.

EXAMPLE 10

Example 1 is repeated with an emulsion polymer of 135 parts itaconic acid, 270 parts acrylamide, 630 parts acrylonitrile, 5,400 parts butyl acrylate, 1,285 parts ethyl acrylate, and 1,285 parts methyl acrylate, as the foam. Similar results are obtained when isobutyl acrylate or 2-ethylhexyl acrylate are used in place of butyl acrylate or ethyl acrylate.

I claim:

1. A laminate consisting of a. a transparent plastic surface film of a thermoset emulsion polymer *transferred from a release surface and* adhered to b. a crushed, crosslinked thermoset resilient foam of a thermoset emulsion polymer adhered to c. a textile fabric substrate, with d. a decorative layer between (a) and (b) the crushed foam layer (b) being self-bonded to the substrate (c) and the surface film.

2. The article of claim 1 in which the surface film has printed thereon a decorative layer (d) between (a) and (b), the article has a fabric like hand, and the crushed foam is less than about 90 mils in thickness.

3. The article of claim 1 in which reaction products of one or more of a crosslinking group of the structure

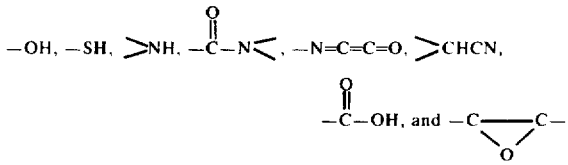

provides the crosslinking.

4. The article of claim 3 in which the foam (b) and the film (a) contain a polymerized unsaturated acid and the crosslinking is provided by a water soluble condensate of formaldehyde with urea, N,N'-ethyleneurea, dihydroxyethyl ureas or a triazine.

* * * * *

Disclaimer

Re. 28,682.—*Charles E. Hoey,* Marlton, N.J., DECORATIVE LAMINATE. Patent dated Jan. 13, 1976. Disclaimer filed May 29, 1981, by the assignee, *Rohm & Haas Co.*

Hereby enters this disclaimer to all claims of said patent.

[*Official Gazette October 13, 1981.*]